(12) United States Patent
Veque et al.

(10) Patent No.: US 10,766,179 B2
(45) Date of Patent: Sep. 8, 2020

(54) SUPPLY DEVICE FOR A MOLDING DEVICE, MOLDING LINE AND METHOD FOR CONTROLLING SAID MOLDING LINE

(71) Applicant: ESSILOR INTERNATIONAL (COMPAGNIE GENERALE D'OPTIQUE), Charenton-le-Pont (FR)

(72) Inventors: Eric Veque, Charenton-le-Pont (FR); Hervé Gentils, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 510 days.

(21) Appl. No.: 15/524,877

(22) PCT Filed: Oct. 30, 2015

(86) PCT No.: PCT/FR2015/052938
§ 371 (c)(1),
(2) Date: May 5, 2017

(87) PCT Pub. No.: WO2016/071612
PCT Pub. Date: May 12, 2016

(65) Prior Publication Data
US 2017/0348887 A1 Dec. 7, 2017

(30) Foreign Application Priority Data

Nov. 6, 2014 (FR) ...................... 14 60738

(51) Int. Cl.
*B29C 45/77* (2006.01)
*B29D 11/00* (2006.01)
(Continued)

(52) U.S. Cl.
CPC .............. *B29C 45/77* (2013.01); *B29C 31/04* (2013.01); *B29C 31/06* (2013.01); *B29C 39/006* (2013.01);
(Continued)

(58) Field of Classification Search
CPC ....... B29C 31/04; B29C 31/045; B29C 31/06; B29C 39/006; B29C 39/24;
(Continued)

(56) References Cited

U.S. PATENT DOCUMENTS 3,212,128 A * 10/1965 Carlson ................. B29C 44/388
425/4 R
4,307,760 A 12/1981 Häuser
(Continued)

FOREIGN PATENT DOCUMENTS

| CN | 201544371 | 8/2010 |
|---|---|---|
| FR | 2407805 | 6/1979 |
| FR | 2856007 | 12/2004 |

*Primary Examiner* — Stella K Yi
(74) *Attorney, Agent, or Firm* — Norton Rose Fulbright US LLP

(57) ABSTRACT

The invention relates to a device (1) for supplying at least one molding device (2) with a polymerizable mixture of at least two reactants.

Figure 1:
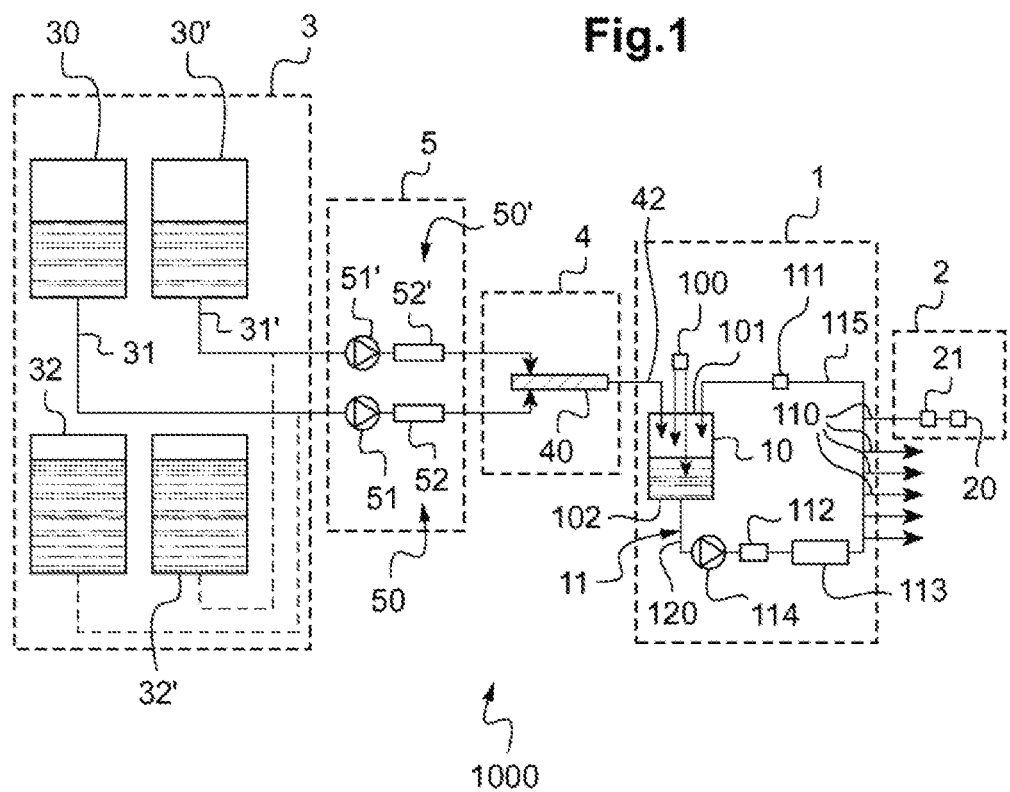

According to the invention, said supply device comprises: a buffer tank (10) suitable for receiving said polymerizable mixture via an inlet (101) of said buffer tank, a supply circuit (11), looped with said buffer tank, to convey the polymerizable mixture to an inlet (110) of said at least one molding device and including, beyond said inlet of the molding device, a return pipe (115) connected to the inlet of the buffer tank for sending a portion of the polymerizable mixture from said return pipe, and a filling pipe (42) of said buffer tank, connected to said inlet of said buffer tank, separate from the return pipe, wherein said buffer tank is also suitable for receiving said polymerizable mixture or at least one of said reactants from said filling pipe.

30 Claims, 2 Drawing Sheets

(51) Int. Cl.
*B29C 31/04* (2006.01)
*B29C 31/06* (2006.01)
*B29C 39/24* (2006.01)
*B29C 39/00* (2006.01)
*B29C 45/18* (2006.01)
*B29K 105/00* (2006.01)

(52) U.S. Cl.
CPC .......... *B29C 39/24* (2013.01); *B29C 45/1808* (2013.01); *B29C 45/1866* (2013.01); *B29D 11/00432* (2013.01); *B29C 2045/1891* (2013.01); *B29C 2945/76056* (2013.01); *B29C 2945/76545* (2013.01); *B29C 2945/76832* (2013.01); *B29K 2105/0002* (2013.01)

(58) Field of Classification Search
CPC ............ B29C 45/1808; B29C 45/1866; B29C 44/0415; B29D 11/00432
See application file for complete search history.

(56) References Cited

U.S. PATENT DOCUMENTS

| | | |
|---|---|---|
| 5,187,001 A | 2/1993 | Brew |
| 5,382,394 A | 1/1995 | Terhardt |
| 5,435,943 A * | 7/1995 | Adams ............. B29D 11/00432 264/1.1 |
| 7,614,527 B2 | 11/2009 | Freson et al. |
| 2006/0145380 A1 | 7/2006 | Renkl et al. |

* cited by examiner

SUPPLY DEVICE FOR A MOLDING DEVICE, MOLDING LINE AND METHOD FOR CONTROLLING SAID MOLDING LINE

CROSS-REFERENCE TO RELATED APPLICATIONS

This application is a national phase application under 35 U.S.C. § 371 of International Application No. PCT/FR2015/052938 filed 30 Oct. 2015, which claims priority to French Patent Application No. 1460738 filed 6 Nov. 2014. The entire contents of each of the above-referenced disclosures is specifically incorporated by reference herein without disclaimer.

TECHNICAL FIELD OF THE INVENTION

The present invention relates in a general manner to the field of the molding of polymerizable, notably reactive, mixtures.

It relates in particular to a supply device for supplying at least one molding device with a polymerizable mixture comprising at least two reactants.

It also relates to a molding line comprising, in fluidic communication from upstream to downstream in the direction of fluid flow, a reactant dispensing device, a device for mixing said reactants so as to obtain a polymerizable mixture, and a supply device.

Finally, it relates to a method for controlling such a molding line.

It finds particularly advantageous, but not exclusive, application for the manufacturing of transparent optical articles such as optical, in particular ophthalmic, blanks and lenses, and notably blanks of lenses for spectacles and sunglasses or vision correcting spectacles.

TECHNOLOGICAL BACKGROUND

In order to simultaneously supply several molds of a molding device from a single supply device, notably with a reactive polymerizable mixture, a person skilled in the art is faced with various problems.

One major problem consists in ensuring that all of the molds are supplied satisfactorily under stable conditions, these conditions depending, inter alia, on the pressure at the inlet of the molding device, on the pressure at the inlet of the molds, on the supply volume, or on the viscosity of the mixture received by the molds, notably in the case of a reactive polymerizable mixture.

The problem of supplying several molds simultaneously from one supply device has already been addressed in the past.

However, the existing supply devices are frequently complex and expensive since they provide individual commands relating to each of the molds of the molding device.

Moreover, in the prior art molding devices, the stability of supply, when it is obtained, is associated with a significant loss of molding material.

Thus, the patent FR2407805 discloses a molding line in which, in order to supply a plurality of molds of a molding device, it is necessary, in the supply device, to associate with each mold a control element for regulating the supply of the mold with molding material.

Supply devices for supplying molds with a polymerizable mixture are also known from the documents FR2856007 and U.S. Pat. No. 5,435,943.

SUBJECT OF THE INVENTION

In order to remedy the abovementioned situation of the prior art, the present invention proposes supplying one or more molding devices, each of which comprises a plurality of molds, by means of a single supply device, which makes it possible to regulate the pressure at the inlet of the molding devices and at the inlet of the molds, and to recover the molding material that is not used.

The invention also relates to a molding line having this supply device.

The invention also proposes a method for controlling the molding line incorporating a supply device according to the invention.

More particularly, the invention proposes a supply device for supplying at least one molding device with a polymerizable mixture, said supply device comprising, from upstream to downstream, a buffer tank designed to receive said polymerizable mixture through an inlet of said buffer tank, and a supply circuit looped with this buffer tank in order, in sequence, to feed the polymerizable mixture to an inlet of said at least one molding device and return some of the polymerizable mixture into the buffer tank via a return line.

The expression "in sequence" means that some of the polymerizable mixture is returned to the buffer tank downstream of said inlet of said at least one molding device.

More specifically, the invention relates to a supply device for supplying at least one molding device with a polymerizable mixture of at least two reactants, said supply device comprising:

a buffer tank designed to receive said polymerizable mixture through an inlet of said buffer tank, a supply circuit, looped with this buffer tank, for feeding the polymerizable mixture to an inlet of said at least one molding device and comprising, beyond said inlet of the molding device, a return line connected to the inlet of the buffer tank in order to return some of the polymerizable mixture into the buffer tank, said buffer tank being designed to receive said polymerizable mixture from said return line, and a filling line for filling said buffer tank, said filling line being connected to said inlet of this buffer tank, being separate from the return line, said buffer tank (10) also being designed to receive said polymerizable mixture or at least one of said reactants from said filling line.

Thus, the buffer tank provided in the invention advantageously makes it possible to limit the losses of polymerizable mixture, for example when it is necessary to purge or clean the supply device.

Furthermore, the supply device according to the invention provides a looped supply circuit which makes it possible to provide consistency in the characteristics of the polymerizable mixture, notably in terms of viscosity, this being a key element that makes it possible to improve the quality of polymerized lenses.

By virtue of the invention, the reactive polymerizable mixture is always in motion, for example by means of a pump provided to operate with a continuous or constant flow rate, thereby advantageously increasing the stability of the viscosity of the reactive polymerizable mixture.

Further non-limiting and advantageous features of the supply device according to the invention are as follows:

the supply circuit comprises a pressure regulating means that is designed to regulate the pressure at the inlet of said at least one molding device, said pressure regulating means being positioned on the return line of the supply circuit, downstream of said inlet of the molding device and upstream of the inlet of the buffer tank;

the buffer tank comprises a checking means for checking the level of polymerizable mixture that it contains;

the supply circuit comprises a pump for supplying said at least one molding device from the buffer tank, said pump being designed to operate with a continuous flow rate, preferably a constant flow rate;

said at least one molding device has one or more molds, and an injection means suited to each of said molds, which may comprise an on/off valve at its inlet;

the molding device is a device for molding ophthalmic lenses.

The invention also proposes a molding line comprising, in fluidic communication from upstream to downstream in the direction of fluid flow, a dispensing device for dispensing at least two different precursor reactants of the polymerizable mixture, and a supply device according to the invention.

Further non-limiting and advantageous characteristics of the molding line according to the invention are as follows:

the dispensing device for dispensing said different reactants comprises two separate dispensing lines for conducting said different reactants to the supply device, and comprises, on each dispensing line, a flow rate regulating means for conducting said different reactants in selected quantities into said supply device;

between said dispensing device and said supply device, a mixing device for mixing said different reactants supplying said filling line with polymerizable mixture is provided;

the supply device has an additional filling line, said dispensing device directly supplying each filling line with one of said reactants of the polymerizable mixture;

the molding line also comprises, upstream of said dispensing device for dispensing said different reactants, a storage device for storing said different reactants, having a storage tank, each storage tank storing one of said different reactants, and supplying a separate dispensing line contained in the dispensing device for conducting said different reactant to the supply device;

the storage device also comprises a separate standby tank per reactant, in order to ensure that the dispensing device is supplied with reactants as a backup to the initial storage tanks;

the molding line also comprises at least one molding device connected to the supply circuit via an inlet of said molding device in order to be supplied with polymerizable mixture.

Thus, according to the invention, that part of the molding line that is situated upstream of the mixing device or of the supply device is not soiled by the polymerizable mixture. This makes it possible to significantly reduce the quantity of cleaning solvent used.

Moreover, the quantity of polymerizable mixture output by the molding device is adapted to the filling of the molds, thereby making it possible to make savings with regard to the quantities of reactants used; a smaller quantity of reactants is lost from the containers when cleaning is necessary.

The invention also proposes a method for controlling a molding line according to the invention, which comprises a step of checking the level of polymerizable mixture in the buffer tank in order, if the level of polymerizable mixture in the buffer tank reaches a given lower limit value, to act on the dispensing device so as to increase the introduction of the reactants or of the polymerizable mixture into the buffer tank through the filling line, and, if the level of polymerizable mixture reaches a given upper limit value, to act on the dispensing device so as to slow down or even stop the introduction of the reactants or of the polymerizable mixture into the buffer tank through the filling line.

Another non-limiting and advantageous characteristic of the control method according to the invention resides in the fact that the lower limit value and upper limit value of the level of polymerizable mixture in the buffer tank are determined as a function of the number of molding devices and of the characteristics of these molding devices. In particular, the lower limit value is such that, without the buffer tank being supplied by the filling line, it allows the molding devices to be supplied for a period of time in which the storage tanks can be replaced by standby tanks, preferably for a period of time of between 10 minutes and 30 minutes.

Thus, unlike the devices known to the inventor, it is possible to continue supplying the molding devices during the operations necessary for replacing the storage tank(s) containing the reactants when it/they are empty.

DETAILED DESCRIPTION OF AN EXEMPLARY EMBODIMENT

The description which follows with reference to the appended drawings, which are given by way of nonlimiting examples, will make it easy to understand what the invention consists of and and how it can be achieved.

In the appended drawings:

FIG. 1 schematically shows a molding line according to the invention; and

Figure 2:
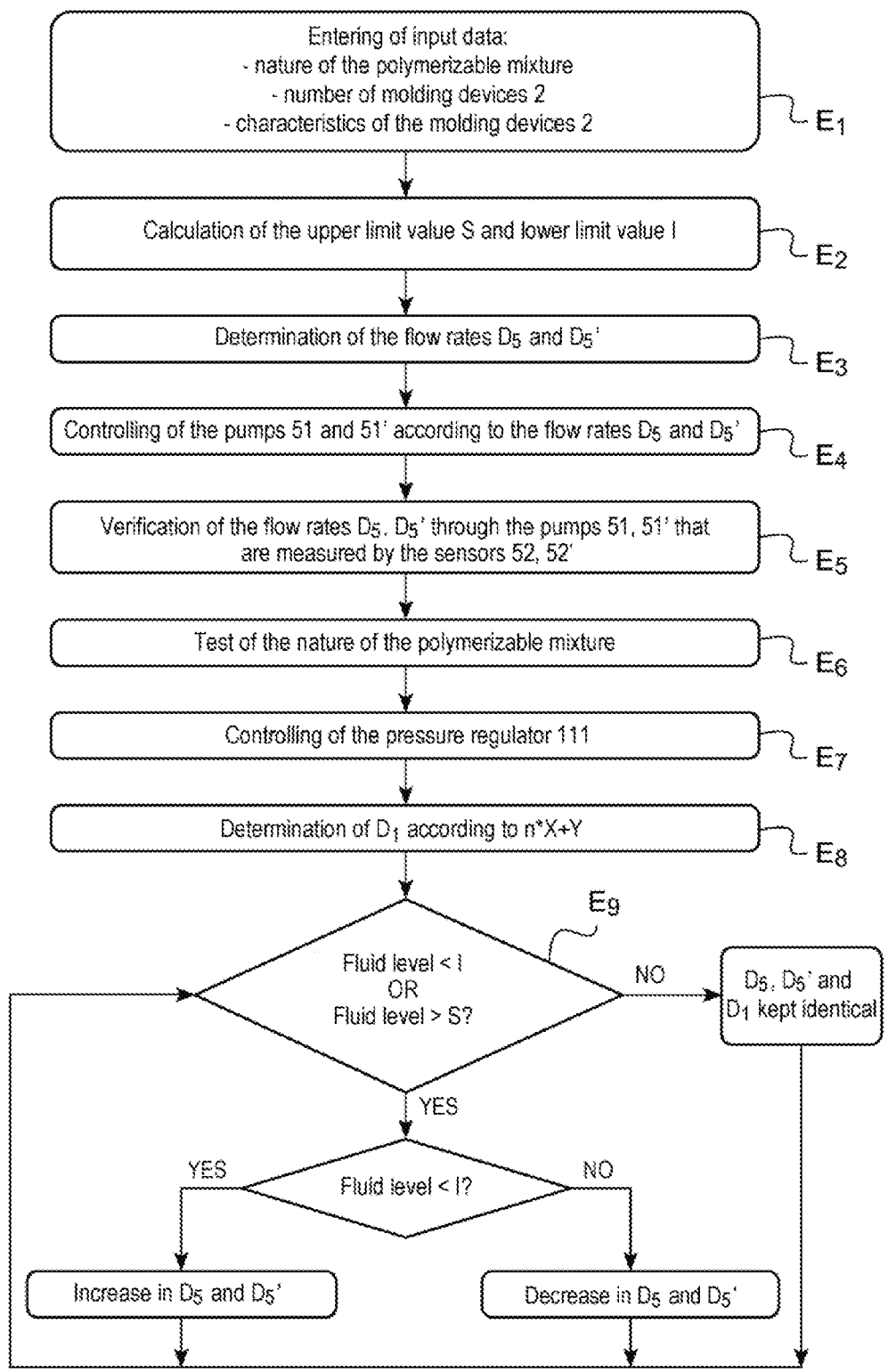

FIG. 2 is a flowchart representing the steps in a method for controlling the molding line schematically shown in FIG. 1.

In the rest of the description, the terms "upstream" and "downstream" will be used in the direction of fluid flow, in order to situate various elements with respect to one another in the supply device, or, more generally, in the molding line.

Similarly, the terms "inlet" and "outlet" will be used in the direction of fluid flow in order to describe the direction of mounting of the elements contained in the supply device, or more generally in the molding line.

A reactive polymerizable mixture is understood to be a mixture of monomers, of pre-polymers and/or of polymers that react with one another so as to form a final polymer material. These reactants are what are known as precursor reactants of the polymerizable mixture.

In particular, in the present case, the reactive polymerizable mixture may be a mixture of reactants that react at least partially with one another simply by being brought into contact, without requiring any external stimulation, such as a thermal, photonic, chemical or mechanical action.

FIG. 1 shows a molding line 1000 which comprises, from upstream to downstream, a storage device 3 for storing reactants, a dispensing device 5 for dispensing said reactants, a mixing device 4 for mixing said reactants, and a supply device 1 for supplying several molding devices 2 that each have one or more molds 20 with a reactive polymerizable mixture.

More specifically, all of these devices are in fluidic communication, such that said reactants are conducted from the storage device 3 to the dispensing device 5 and then pass through the mixing device 4 before being introduced into the supply device 1.

In a preferred embodiment of the invention, the storage device 3 for storing the reactants comprises a separate storage tank 30, 30' per reactant, each storage tank 30, 30' supplying a separate dispensing line 31, 31' with one of said reactants.

Each dispensing line 31, 31' is connected downstream to the mixing device 4.

The dispensing device 5 for dispensing the reactants in FIG. 1 comprises, on the path of each dispensing line 31, 31', a flow rate regulating means 50, 50'.

Each regulating means 50, 50' comprises, from upstream to downstream, a metering pump 51, 51' which makes it possible to precisely meter the quantity of reactant coming from the storage tanks 30, 30' to be introduced into the mixing device 4, and a flow rate measurement sensor 52, 52' which measures the actual flow rate of reactant in the dispensing line 31, 31' at each instant.

The metering pump 51, 51' makes it possible to fix a flow rate $D_5$, $D_5'$ of reactant flowing through each dispensing line 31, 31' from the storage tanks 30, 30' to the mixing device 4.

The metering pumps 51, 51' are, for example, eccentric disk pumps. Alternatively, they are peristaltic pumps.

The dispensing device 5 thus delivers, in a controlled manner, to the single mixing device 4, the reactants conducted from the storage tanks 30, 30' of the storage device 3.

The mixing device 4 comprises a mixer 40, to the inlet of which each of the separate dispensing lines 31, 31', through which said reactants are conducted, are connected. The reactive polymerizable mixture is obtained at the outlet of this mixture 40 and is conducted through a filling line 42 to the supply device 1.

This mixer 40 is preferably a static mixer 40 which is designed for example for mixing fluids in laminar flow.

Thus, advantageously, the reactants output respectively by the storage tanks 30, 30' only come into contact in the mixing device 4.

This mounting providing a separate supply line per reactant between each storage tank 30, 30' and the mixer 40 is particularly suitable when the reactants stored in the storage tanks 30, 30' are different and likely to react with one another under ambient conditions.

Consequently, since only the devices that have been soiled by the reactive polymerizable mixture require frequent cleaning, significant savings on cleaning solvent are made by virtue of the invention. This is because the storage tanks are no longer necessarily cleaned each time they are empty, since they are not the site of any polymerization reaction.

The supply device 1 comprises a buffer tank 10, a supply circuit 11, and said filling line 42.

More specifically, downstream of the outlet of the mixer 40, the filling line 42 is connected to an inlet 101 of the buffer tank 10. An outlet 102 of the buffer tank 10 is for its part connected to a supply line 120 of the supply circuit 11.

Thus, the buffer tank 10 receives, via its inlet 101, the polymerizable mixture coming from the mixer 40 of the mixing device 4, and supplies, at its outlet 102, the supply line 120 of the supply circuit 11.

The supply line 120 conducts said polymerizable mixture from the buffer tank 10 to the molding devices 2.

As shown in FIG. 1, the molding devices 2 are connected to the supply line 120 of the supply circuit 11 by a separate inlet 110 for each of said molding devices 2.

The supply line 120 of the supply circuit 11 is continued beyond said inlets 110 of the molding devices 2 by a return line 115 in order to be connected to the inlet 101 of the buffer tank 10.

Thus, the supply line 120 of the supply circuit 11 starts at the outlet of the buffer tank 10 and leads, downstream, via the return line 115, to the inlet 101 of the buffer tank 10, so as to form a return loop into this buffer tank 10.

In this way, the supply circuit 11 makes it possible to return a certain quantity of reactive polymerizable mixture to the buffer tank 10 through the return line 115, which is separate from the filling line 42.

The return line 115 and the filling line 42 are in this case separate notably in that they are supplied, upstream, by two separate sources of polymerizable mixture or of reactants.

The return line 115 is also separate from the filling line 42 in that it has at least one line portion that is physically separated from said filling line 42.

Thus, advantageously, by virtue of the return line 115, the excess reactive polymerizable mixture is not lost but recycled into the buffer tank 10.

In the exemplary embodiment described here, the buffer tank 10 has only one inlet 101, to which the filling line 42 and the return line 115 are directly connected. In other words, the inlet 101 of the buffer tank 10 is an inlet common to the two separate lines 42, 115 that conduct the polymerizable mixture into the buffer tank 10.

Alternatively, it may be conceivable for the return line and/or the filling line to be connected indirectly to the inlet of the buffer tank. For example, it is conceivable for the return line to be indirectly connected to the inlet of the buffer tank by being connected to the filling line, itself directly connected to the inlet of the buffer tank.

In a further alternative, provision could be made for the inlet of the buffer tank to have two separate inlets: one to which the filling line is connected and another to which the return line is connected.

The molding devices 2 are conventional for a person skilled in the art and do not form part of the subject matter of the invention; therefore, they will not be described in detail here.

It should nevertheless be stated that these molding devices can have one or more molds 20 and associated injection means 21.

The molding devices 2 are not necessarily identical, but their function within the molding line 1000 is similar. The same goes for the molds 20, which are not necessarily all identical, but the function of which within the molding device 2 is similar.

Each injection means 21 can comprise, at its inlet, a valve (not shown), known as an "on/off" valve, that can take up either an open position, allowing the mold 20 to be filled with polymerizable mixture, or a closed position, preventing the filling of said mold 20 with polymerizable mixture.

Thus, each mold 20 can take up several operating states: a filling state, during which the valve is in the open position, and a standby state, or a cooling state, during which the valve is in the closed position.

Moreover, the supply circuit 11 can comprise, downstream of the outlet 102 of the buffer tank 10 and upstream of the inlets 110 of the molding devices 2, a pump 114, a mixer 112, and a filter 113.

In addition, a pressure regulating means 111 for regulating the pressure at the inlets 110 of the molding devices 2 can be provided on the return line 115 of the supply circuit 11, downstream of the inlets 110 of the molding devices 2.

The pump 114 can cause the reactive polymerizable mixture to flow through the supply line 120 at a selected flow rate $D_1$.

The flow rate $D_1$ can be for example continuous, that is to say such that the polymerizable mixture is always in motion in the supply line 120, or can even be constant.

Preferably, as shown in FIG. 1, the pump 114 is positioned on the path of the supply line 120, at the outlet of the buffer tank 10.

The mixer 112 makes it possible to homogenize the reactive polymerizable mixture coming from the mixing device 4 through the filling line 42 with the reactive polymerizable mixture that has already flowed through the entire supply circuit 11 and has been returned to the buffer tank 10 through the return line 115.

The mixer 112 is for example a static mixer of the same type as the mixer 40 of the mixing device 4.

The filter 113 makes it possible to filter any solid particles. These solid particles, for example solid additives that have been insufficiently dissolved or other solid contaminants, should be eliminated before the reactive polymerizable mixture has been introduced into the molds 20. Specifically, introduction of these solid particles into one of the molds 20 would form a diffusion point in the final optical lens obtained, making it unusable.

Preferably, the filter 113 is disposed on the path of the supply line 120, downstream of the mixer 112. However, it may be conceivable to reverse the position of the mixer 112 and of the filter 113 on the supply line 120.

The pressure regulator 111 makes it possible to regulate the pressure in the entire supply circuit 11. In particular, it allows better control of the pressure at the inlet 110 of each of the molding devices 2.

To this end, the pressure regulator 111 is positioned on the return line 115 of the supply circuit 11, upstream of the inlet of the buffer tank 10 and downstream of the inlet 110 of the final molding device 2.

Consequently, the pressure regulator 111 provides an additional advantage for the invention, ensuring a constant and identical pressure at the inlet of all of the molding devices 2.

The pressure regulator 111 makes it possible to maintain the constant pressure in the supply circuit 11, by increasing or reducing the flow rate D of reactive polymerizable mixture reinjected into the buffer tank 10, it being possible for the pressure in the supply circuit 11 to vary as a function notably of the number of molds 20 and of their operating state.

The pressure regulator 111 can receive information relating to the pressure in the supply circuit 11, either directly, by means of a pressure sensor in said supply circuit 11, or indirectly, by knowing the operating states of the molds 20 and their characteristics, such as their hourly consumption of polymerizable mixture, for example.

When information relating to the pressure is obtained directly, the pressure regulator 111 increases the flow rate D of reactive polymerizable mixture reinjected into the buffer tank 10 when the pressure in the return line 115 increases, and, conversely, reduces the flow rate D when the pressure in the return line 115 decreases.

When information relating to the pressure is obtained indirectly, the pressure regulator 111 can define the flow rate D of reactive polymerizable mixture reinjected into the buffer tank 10 that is necessary in order to maintain the constant pressure in the supply circuit 11.

An example of a pressure regulator 111 that directly receives information relating to the pressure in the return line 115 and acts on the flow rate D of the reactive polymerizable mixture reinjected into the buffer tank 10 is described below. Such a pressure regulator operates on the principle of a membrane connected to a needle. The needle has the role of moving part of the membrane so as to reduce or increase the diameter of the return line 115 through which the polymerizable mixture flows. In order to measure the pressure in the return line 115, a setpoint pressure value is given by a spring, or alternatively by an air pressure, on the membrane. Any variation in pressure in the return line 115 results in movements of the membrane which are transmitted to the needle. This makes it possible to modulate the flow rate D of reactive polymerizable mixture reinjected into the buffer tank 10 and thus to maintain a constant pressure in the supply circuit 11.

Furthermore, the supply circuit 11 looped to the buffer tank 10 allows the reactive polymerizable mixture to be in virtually constant motion. This motion makes it possible to stabilize the viscosity of the reactive polymerizable mixture.

On account of the increased stability of the viscosity of the reactive polymerizable mixture, serious energy savings can be realized. This is because the entire molding line 1000 can remain at ambient temperature and no longer needs to be partially refrigerated, as is generally provided to slow down the polymerization kinetics of the reactants.

In a preferred embodiment, as is shown in FIG. 1, the buffer tank 10 comprises checking means 100 for checking the quantity of polymerizable mixture that it contains.

These checking means 100 make it possible to check that the level of fluid in the buffer tank 10 does not exceed a predetermined upper limit value S or that the level of fluid does not drop below a predetermined lower limit value I.

Said upper limit value S and lower limit value I depend on the number of molding devices 2 and on the characteristics of said molding devices 2. The characteristics of the molding devices 2 are, for example, the number of molds 20 and their characteristics, such as their hourly consumption of polymerizable mixture. Thus, the buffer tank 10 ensures that, at each instant, the respective molding devices 2 can be supplied with reactive polymerizable mixture in a sufficient quantity for their respective molds 20 to be able to be filled, while limiting the loss of reactive polymerizable mixture In a recommended embodiment of the invention, the storage device 3 also has a separate standby tank 32, 32' per reactant.

Each standby tank 32, 32' is connected to the corresponding separate dispensing line 31, 31', upstream of the dispensing device 5.

Advantageously, they can be substituted for the initial storage tanks 30, 30' when the level of reactants in these storage tanks 30, 30' reaches a given low level, or when these storage tanks 30, 30' have been emptied for cleaning or maintenance.

The standby tanks 32, 32' thus make it possible to ensure that the mixing device 4 is supplied with reactants as a backup to the storage tanks 30, 30'.

Moreover, each separate standby tank 32, 32' can be provided with a valve (not shown) which allows the reactant to flow or not to flow in said dispensing line 31, 31'.

Advantageously, these standby tanks 32, 32' allow rapid replacement of the initial storage tanks 30, 30'. Moreover, the volume of the buffer tank 10 that is necessary for the molding devices 2 to be supplied continuously is smaller.

It is also conceivable for the molding line to require more than two initial reactants.

In this case, if certain reactants can be mixed without causing a polymerization reaction, two different mixtures to be introduced into the storage tanks can be prepared.

In an alternative to the molding line in FIG. 1, it may be conceivable for the molding line not to comprise a mixing device.

In other words, it may be conceivable for the dispensing device to be connected directly to the supply device.

It would also be conceivable to provide two filling lines that the dispensing device would supply directly with one of said reactants of the polymerizable mixture. In other words, each filling line would directly connect one of said storage tanks to the buffer tank, passing via the dispensing device comprising the flow rate regulating means. These filling lines could be connected to a common inlet of the buffer tank or to separate inlets of the buffer tank.

It may also be conceivable for the buffer tank to incorporate the mixing device.

In another variant of the molding line according to the invention, as many separate storage tanks, separate dispensing and/or filling lines, and optionally separate standby tanks as there are different reactants could also be provided. The mixer of the mixing device would then comprise as many separate inlets as there are separate lines which conduct the reactants therein. And all of the reactants would be mixed in a selected quantity in this mixing device in order to obtain the desired reactive polymerizable mixture at the outlet of said mixing device.

In yet another variant, the molding line could comprise only one molding device, itself being able to have one or more molds. The supply circuit would then comprise a single inlet to this molding device.

FIG. 2 shows steps in a method for controlling the molding line 1000.

This control can be realized by means of a programmable central processing unit.

In a first step E1, the nature of the reactive polymerizable mixture, the number of molding devices 2, and the characteristics of the molding devices 2 are entered and saved in a memory of the central processing unit. For example, some of these characteristics can be the number of molds 20 contained in said molding devices 2 and the hourly consumption of these molds 20.

In a second step E2, the central processing unit calculates the upper limit value S and lower limit value I of the reactive polymerizable mixture that the buffer tank 10 needs to contain in order to supply the molding devices 2 with a sufficient quantity and with the least loss possible.

This upper limit value S and this lower limit value I can be calculated as a function of the number of molding devices 2 and of the characteristics of the molding devices 2.

In particular, the lower limit value I has to allow the buffer tank 10 to supply the molding devices 2 independently, that is to say even when the buffer tank 10 does not receive reactive polymerizable mixture from the filling line 42 downstream of the mixing device 4, specifically for a period of time necessary for the possible replacement, or possible filling, of the storage tanks 30, 30'. This period of time can be between 10 minutes and 30 minutes, and is more generally around 20 minutes.

In a third step E3, as shown in FIG. 2, the central processing unit calculates the flow rate $D_5$ and, respectively, $D_5'$ to be set in the dispensing line 31 and, respectively, 31' in order to obtain the desired reactive polymerizable mixture at the outlet of the mixing device 4.

In a fourth step E4, the central processing unit controls the metering pump 51 and, respectively, 51' such that it sets the flow rate $D_5$ and, respectively, $D_5'$ in the dispensing line 31 and, respectively, 31'.

A fifth step E5 involves testing whether the metering pumps 51 and 51' exhibit the desired flow rates $D_5$ and $D_5'$.

This test consists in simultaneously weighing the two reactants output respectively from the two storage tanks 30, 30' for a given time while measuring, by means of flow rate measurement sensors 52, 52', the respective flow rates of the reactants in said dispensing lines 31, 31'.

Conventionally, throughout the method, and in real time, the respective flow rates $D_5$, $D_5'$ through the respective metering pumps 51, 51' are readjusted as a function of the flow rates measured by the respective flow rate sensors 52, 52' in order to permanently supply the mixing device 4 with the ratio of reactants for forming the desired reactive polymerizable mixture. The flow rates $D_5$ and $D_5'$ generally allow a maximum tolerance of ±1% in order to ensure the chemical specifications of the polymerizable mixture.

A sixth step E6 involves testing whether the polymerizable mixture obtained at the outlet of the mixing device 4 corresponds to the polymerizable mixture wanted.

This test consists in taking a sample of polymerizable mixture from the outlet of the mixer 40 and in testing it with the aid, for example, of optical methods.

These optical methods are conventional to a person skilled in the art and are not at the heart of the invention, and so they will not be described in detail here.

In a seventh step E7, the pressure regulator 111 is controlled so as to set a constant and identical pressure at the inlet 110 of each of the molding devices 2.

In an eighth step E8, the flow rate $D_1$ to be set in the supply circuit 11 is determined, and notably in the supply line 120 in order that the molding devices 2 are supplied satisfactorily, as a function of a desired speed and/or of a consumption of polymerizable mixture by these molding devices 2.

Thus, if a molding device 2a needs to supply $n_a$ molds 20a such that each of these molds 20a consumes a flow rate Xa (kg/hour) of reactive polymerizable mixture, the flow rate $D_1$ in the supply line 120 of the supply circuit 11 needs to be at least equal to:

$D_1 = n_a * Xa$, that is to say the flow rate necessary for strictly supplying the molds 20a. In other words, the flow rate $D_1$ needs to be at least equal to the product of the number $n_a$ of molds 20a multiplied by the flow rate Xa consumed by each of these molds 20a.

Similarly, if, in addition to supplying the molding device 2a, the supply circuit 11 needs to supply an additional molding device 2b, comprising $n_b$ molds 20b such that each of these molds 20b consumes a flow rate Xb (kg/hour) of reactive polymerizable mixture, the flow rate $D_1$ in the supply circuit 11 needs to be at least equal to:

$D_1 = n_a * Xa + n_b * Xb$, i.e. the flow rate necessary for strictly supplying all of the molds 20a and the molds 20b.

This flow rate $D_1$ is voluntarily determined such that it is greater than the flow rate necessary for strictly supplying the molds 20, i.e.:

$D_1 = \Sigma_i(n_i * Xi) + Y$, where $n_i$ is the number of molds 20i contained in a molding device 2i, each of these molds 20i receiving a flow rate Xi of reactive polymerizable mixture, and Y is a safety flow rate.

Consequently, if all of the molds 20 of the set of molding devices 2 are supplied simultaneously, the safety flow rate Y of reactive polymerizable mixture corresponds to the flow rate D of reactive polymerizable mixture returned to the buffer tank 10, that is to say to the flow rate of fluid in the return line 115.

Generally, the flow rate D of reactive polymerizable mixture returned to the buffer tank 10 depends essentially on the number of molds 20 in operation in each molding device 2, and more particularly on the number of molds 20 which are simultaneously in a filling state.

For example, if, during production, the molding device 2a supplies $n'_a$ molds 20a instead of the $n_a$ initial molds, the flow rate D of reactive polymerizable mixture returned to the buffer tank 10 will be:

$$D = Y + (n_a - n'_a) * Xa.$$

In general, the safety flow rate Y is selected to be at least equal to the flow rate X received by a mold 20, but it can be selected to be equivalent to 10% or 20% or even 50% of the flow rate $D_1$.

A ninth step E9, as shown in FIG. 2, involves determining whether the fluid level in the buffer tank 10 is between the lower limit value I and upper limit value S calculated in step E2, less than the lower limit value I, or greater than the upper limit value S.

If the fluid level in the buffer tank 10 is greater than or equal to the lower limit value I while being less than or equal to the upper limit value S, the flow rates $D_5$ and $D_5'$ in the dispensing lines 31, 31' and the flow rate $D_1$ in the supply line 120 of the supply circuit 11 are maintained as in the step previously carried out in the control method.

If the fluid level in the buffer tank 10 is less than the lower limit value I, the two metering pumps 51 and 51' are acted on in a proportional manner in order to increase the flow rates $D_5$ and $D_5'$ of the reactants in the dispensing lines 31, 31', without changing the ratio of the reactants within the mixer 40.

In this way, the reactive polymerizable mixture flowing in the filling line 42 at the outlet of the mixer 40 is always the same, but a greater quantity of this reactive polymerizable mixture supplies the buffer tank 10.

Specifically, given that said buffer tank 10 always empties at the same flow rate, increasing the flow rates $D_5$ and $D_5'$ in the dispensing lines 31 and 31' will make it possible to increase the quantity of reactive polymerizable mixture in the buffer tank 10.

If necessary, it is also possible to decrease the flow rate $D_1$ in the supply line of the supply circuit 11 and/or to slow down the rate of filling of the molds 20.

If the fluid level in the buffer tank 10 is greater than the upper limit value S, the two metering pumps 51 and 51' are acted on in a proportional manner in order to decrease the flow rates $D_5$ and $D_5'$ in the dispensing lines 31, 31', without changing the ratio of the reactants within the mixer 40.

Thus, the reactive polymerizable mixture at the outlet of the mixer 40 is always the same, but a smaller quantity of this reactive polymerizable mixture supplies the buffer tank 10 via the filling line 42.

Specifically, given that said buffer tank 10 always empties at the same flow rate, decreasing the flow rates $D_5$ and $D_5'$ in the dispensing lines 31, 31' will make it possible to decrease the quantity of reactive polymerizable mixture in the buffer tank 10.

If necessary, it is possible to stop the flow rates $D_5$ and $D_5'$ in the dispensing lines 31, 31'.

The control method loops starting from the ninth step E9.

The method can go back to the first step E1 when the input data are modified, for example when the number of molding devices 2 is modified.

The method can stop when the machine stops.

The following detailed example describes a manner of using the molding line 1000.

In this example, a different mixture is introduced into each of the storage tanks 30, 30'.

The first mixture comprises a monomer A, a release agent and a UV absorber. The monomer A can be, for example, a diisocyanate.

The second mixture comprises another monomer B, different than the monomer A, a bluing agent and a catalyst. The monomer B can be, for example, a dithiol.

In order to come close to the above description, the first and second mixtures will be referred to as first and second reactants.

The first and second reactants are conducted through the dispensing device 5 into the mixer 40 of the mixing device 4, by means of eccentric disk pumps 51, 51', and the flow rates are measured by flow meters 52, 52'.

The mixer 40 is preferably a static mixer, for example a mixer from the company Nordson®, "IN-Line Mixer" series, or an "X-Grid Static Mixer" provided by the company Stamixco®, or a MikroMakro model mixer from the company Fluitec®, or a mixer of the series 246, 250, 275 distributed by the company Koflo®, or a mixer of the series S, 100 or 150 from the company stratiflo.

In this particular case, at the outlet of the mixer 40, a polythiourethane-based reactive polymerizable mixture is obtained. This mixture is highly suitable for producing optical lenses, and notably ophthalmic lenses, since it is a transparent material.

This same mixture is usually only considered to be usable for three hours, or at best five hours after the reactants have been mixed. Beyond this time, the mixture, which has started to react with itself, reaches a degree of solidification such that it becomes unusable. Notably, said mixture can no longer be injected into the molds 20 since its viscosity becomes too high to give rise to a fluid flow, and it contains numerous pre-polymerized elements which can create optical defects in a lens that would be manufactured with this material.

The polymerization reaction between the two reactants takes place as soon as the reactants come into contact, without requiring any outside stimulation, such as a thermal, photonic, chemical or mechanical action.

In this example, the molding devices 2 comprise filling machines 21 which inject the polymerizable mixture into the molds 20 which can be of various types. This injection process is controlled by a pump or alternatively by a valve. The filling machines of the example make it possible to produce 300 optical lenses in one hour.

These filling machines 21 supply the molds 20, also known as assemblies, for molding concave or convex lenses.

Each of these filling machines 21 needs to be supplied with polythiourethane-based reactive polymerizable mixture at X=18 kg/hour.

The supply circuit 11 comprises up to 6 inlets 110 which each supply a molding device 2 such as an automatic, semi-automatic or manual filling machine, which comprises n=1 or 2 (or more) filling machine 21, which can also be known as "filling heads", i.e. as many filling machines 21 as there are molds 20 to be filled.

Provision can be made for the safety flow rate Y of polythiourethane-based reactive polymerizable mixture to be 18 kg/hour.

Thus the flow rate D1 of the supply circuit 11 is fixed at:

$$D1 = n*X + Y = 6*18 + 18 = 126 \text{ kg/hour.}$$

If, during production, only one of the two filling machines 21 is in operation, the flow rate D of polythiourethane-based reactive polymerizable mixture returning to the buffer tank 10 will be:

$$D = (1*18 + 18) = 36 \text{ kg/hour.}$$

The invention claimed is:

1. A supply device for supplying at least one molding device with a polymerizable mixture of at least two reactants that react with one another to form a final polymer material, said supply device comprising:

a buffer tank designed to receive said polymerizable mixture of at least two reactants that react with one another to form a final polymer material through an inlet of said buffer tank, a supply circuit, looped with this buffer tank, for feeding the polymerizable mixture to an inlet of said at least one molding device and comprising, beyond said inlet of the at least one molding device, a return line connected to the inlet of the buffer tank in order to return some of the polymerizable mixture into the buffer tank, said buffer tank being designed to receive said polymerizable mixture from said return line, and a filling line for filling said buffer tank, said filling line being connected to said inlet of this buffer tank, being separate from the return line, said buffer tank being designed to receive said polymerizable mixture or at least one of said reactants from said filling line.

2. The supply device as claimed in claim 1, wherein the supply circuit comprises a pressure regulating means that is designed to regulate the pressure at the inlet of said at least one molding device, said pressure regulating means being positioned on the return line of the supply circuit, downstream of said inlet of the at least one molding device and upstream of the inlet of the buffer tank.

3. The supply device as claimed in claim 1, wherein the buffer tank comprises a checking means for checking the level of polymerizable mixture that it contains.

4. The supply device as claimed in claim 1, wherein the supply circuit comprises a pump for supplying said at least one molding device from the buffer tank, said pump being designed to operate with a continuous flow rate.

5. The supply device as claimed in claim 1, wherein said at least one molding device has one or more molds, and an injection means suited to each of said one or more molds, which may comprise an on/off valve at its inlet.

6. The supply device as claimed in claim 1, wherein the molding device is a device for molding ophthalmic lenses.

7. A molding line comprising, in fluidic communication from upstream to downstream in the direction of fluid flow:

a dispensing device for dispensing at least two different precursor reactants of the polymerizable mixture, and a supply device as claimed in claim 1.

8. The molding line as claimed in claim 7, wherein the dispensing device for dispensing said at least two different precursor reactants comprises two separate dispensing lines for conducting said at least two different precursor reactants to the supply device, and comprises, on each dispensing line, a flow rate regulating means for conducting said at least two different precursor reactants in selected quantities into said supply device.

9. The molding line as claimed in claim 7, wherein, between said dispensing device and said supply device, a mixing device for mixing said at least two different precursor reactants supplying said filling line with polymerizable mixture is provided.

10. The molding line as claimed in claim 7, wherein the supply device has an additional filling line, said dispensing device directly supplying each filling line with one of said reactants of the polymerizable mixture.

11. The molding line as claimed in claim 7, which also comprises, upstream of said dispensing device for dispensing said at least two different precursor reactants, a storage device for storing said at least two different precursor reactants, having a storage tank, each storage tank storing one of said at least two different precursor reactants, and supplying a separate dispensing line contained in the dispensing device for conducting said at least two different precursor reactant to the supply device.

12. The molding line as claimed in claim 11, wherein the storage device also comprises a separate standby tank per reactant, in order to ensure that the dispensing device is supplied with reactants as a backup to the initial storage tanks.

13. The molding line as claimed in claim 7, which also comprises at least one molding device connected to the supply circuit via an inlet of said molding device in order to be supplied with polymerizable mixture.

14. A method for controlling a molding line as claimed in claim 7, characterized in that it comprises a step of checking the level of polymerizable mixture in the buffer tank in order:

a) if the level of polymerizable mixture in the buffer tank reaches a given lower limit value, to act on the dispensing device so as to increase the introduction of the at least two reactants or of the polymerizable mixture into the buffer tank through the filling line, and b) if the level of polymerizable mixture reaches a given upper limit value, to act on the dispensing device so as to slow down or even stop the introduction of the at least two reactants or of the polymerizable mixture into the buffer tank through the filling line.

15. The method for controlling a molding line as claimed in claim 14, wherein the lower limit value and upper limit value of the level of polymerizable mixture in the buffer tank are determined as a function of the number of molding devices and of the characteristics of these molding devices.

16. The method for controlling a molding line as claimed in claim 14, wherein the lower limit value is such that, without the buffer tank being supplied by the filling line, it allows the at least one molding devices to be supplied for a period of time in which the storage tanks can be replaced by standby tanks, preferably for a period of time of between 10 minutes and 30 minutes.

17. The supply device as claimed in claim 1, wherein the buffer tank has a single inlet to which are directly connected the filling line and the return line.

18. The supply device as claimed in claim 1, wherein at least one of the return line and the filling line are connected indirectly to the inlet of the buffer tank by being connected to the other line, itself directly connected to the inlet of the buffer tank.

19. The supply device as claimed in claim 1, wherein the inlet of the buffer tank comprises two separate inlets: one inlet to which the filling line is connected and another inlet to which the return line is connected.

20. The supply device as claimed in claim 1, wherein the supply circuit comprises a pump, a mixer, and a filter positioned on a supply line of the supply circuit downstream of an outlet of the buffer tank and upstream of the inlet of the at least one molding device.

21. The supply device as claimed in claim 20, wherein the pump is positioned on the path of the supply line, at an outlet of the buffer tank.

22. The supply device as claimed in claim 20, wherein the filter is disposed on the path of the supply line, downstream of the mixer.

23. The supply device as claimed in claim 20, wherein the mixer is disposed on the path of the supply line, downstream of the filter.

24. The supply device as claimed in claim 20, wherein the mixer is a static mixer.

25. The supply device as claimed in claim 2, wherein the pressure regulating means receives information relating to the pressure in the return line and acts on a flow rate of the polymerizable mixture reinjected into the buffer tank.

26. The supply device as claimed in claim 4, wherein the supply circuit comprises a pump for supplying said at least one molding device from the buffer tank, said pump being designed to operate with a constant flow rate.

27. The molding line as claimed in claim 8, wherein the flow rate regulating means of each dispensing line of the dispensing device comprises a metering pump and a flow rate measurement sensor.

28. The molding line as claimed in claim 27, wherein the metering pump of each dispensing line is an eccentric disk pump.

29. The molding line as claimed in claim 9, wherein the mixing device comprises a mixer that is a static mixer used for laminar flows.

30. The molding line as claimed in claim 29, wherein the static mixer is one of the following: a mixer from the company Nordson®, "IN-Line Mixer" series, or an "X-Grid Static Mixer" provided by the company stamixco®, or a MikroMakro model mixer from the company Fluitec®, or a mixer of the series 246, 250, 275 distributed by the company Koflo®, or a mixer of the series S, 100 or 150 from the company stratiflo.

\* \* \* \* \*